United States Patent [19]

Moriyama et al.

[11] Patent Number: 4,650,030
[45] Date of Patent: Mar. 17, 1987

[54] TRACTIVE POWER TRANSMITTING MEANS FOR VEHICLES HAVING ROTARY PISTON ENGINE

[75] Inventors: Naomune Moriyama; Masaya Hamamoto, both of Hiroshima, Japan

[73] Assignee: Mazda Motor Corporation, Hiroshima, Japan

[21] Appl. No.: 766,205

[22] Filed: Aug. 16, 1985

[30] Foreign Application Priority Data

Aug. 20, 1984 [JP] Japan ............... 59-126509[U]

[51] Int. Cl.⁴ ............................................. B60K 5/12
[52] U.S. Cl. ................... 180/292; 180/69.1; 123/195 R
[58] Field of Search .......... 180/69.1, 297, 292, 180/245, 251; 74/665 F; 123/195 R, 197 R

[56] References Cited

U.S. PATENT DOCUMENTS 1,947,213  2/1934  Meyer ........................... 180/292
2,024,099  12/1935  Hofweber et al. .............. 180/292
3,289,647  12/1966  Turner et al. .................. 123/8

FOREIGN PATENT DOCUMENTS 56-62226  5/1981  Japan .

Primary Examiner—John A. Pekar
Assistant Examiner—Donn McGiehan
Attorney, Agent, or Firm—Fleit, Jacobson, Cohn & Price

[57] ABSTRACT

A motor vehicle having a rotary piston engine located at a front part of the vehicle with the engine output shaft extending in a longitudinal direction of the vehicle. A speed changing transmission and a center differential gear unit are arranged in this order from the engine so that the center differential gear unit drives the rear propeller shaft and the front differential gear unit. The front differential gear unit is located beneath the engine and driven through a transfer shaft by the center differential gear unit. The front differential gear unit is mounted on the oil pan of the engine which is attached to the lower part of the engine casing.

9 Claims, 6 Drawing Figures

TRACTIVE POWER TRANSMITTING MEANS FOR VEHICLES HAVING ROTARY PISTON ENGINE

BACKGROUND OF THE INVENTION

1. Field of the Invention

The present invention relates to vehicles equipped with rotary piston engines. More particularly, the present invention pertains to tractive power transmitting mechanisms for vehicles having rotary piston engines.

2. Description of Prior Art

In motor vehicles of the front-engine, front-wheel-drive type or of the four-wheel drive type, a differential gear unit is required in the front axle. Conventional motor vehicles have such front differential gear units mounted through resilient rubber mounts on front frames of the vehicle bodies as taught, for example, by Japanese utility model disclosure No. 56-62226. The utility model does not describe the location of the front differential gear unit with respect to the engine. However, in order that the engine be supported as low as possible as usually required in passenger vehicles, it has also been proposed to locate the front differential gear unit at one side of the engine. In the case of a vehicle having a rotary piston engine, however, if the front differential gear unit is located at one side of the engine, a problem will be encountered in the arrangements of shafts for transmitting the engine power from the transmission unit to the front differential gear unit. A rotary piston engine generally has a transverse width greater than that of a reciprocating piston engine so that the propeller shaft between the transmission unit and the front differential gear unit has to be inclined with respect to the longitudinal axis at an angle greater than that in a vehicle having a reciprocating piston engine. As a result, rotation cannot be transmitted smoothly to and from the propeller shaft, and the universal joints at the opposite ends of the propeller shaft may possibly be overloaded.

It may be possible to mount the front differential gear unit directly on the engine casing so that the inclination angle of the propeller shaft can be decreased. However, such an arrangement is not recommendable because there will be a possibility of interference with various engine components, such as intake and exhaust manifolds, ignition plugs and other engine accessories. It should further be noted that a rotary engine includes a casing comprised of a plurality of housings which are connected together by means of connecting bolts and, if the front differential gear unit is mounted on one of the housings, the reaction force on the casing of the front differential gear unit may apply to the housing on which the gear unit is mounted a force which tends to separate the subject housing, from the adjacent housing weakening the seal between these housings.

SUMMARY OF THE INVENTION

It is therefore an object of the present invention to provide a tractive power transmitting mechanism for a vehicle having a rotary piston engine.

Another object of the present invention is to provide an arrangement wherein a front differential gear unit is mounted on a rotary piston engine without producing any problems described above.

A further object of the present invention is to provide a novel arrangement of a front differential gear unit and a rotary piston engine in a vehicle of a front-engine, front-wheel-drive type.

Still a further object of the present invention is to provide an arrangement of a front differential gear unit suitable for a vehicle of a front-engine, front-wheel-drive type having a rotary piston engine.

According to the present invention, the above and other objects can be accomplished by a motor vehicle comprising a rotary piston engine including a casing comprised of a rotor housing having an inner wall of trochoidal configuration and a pair of side housings attached to the opposite sides of said rotor housing to define a rotor cavity in the casing, a rotor disposed in said rotor cavity for rotation and supported by an output shaft, oil pan means located beneath the rotary piston engine and having a peripheral portion secured to the casing of said rotary piston engine to define lubricant oil reservoir means, differential gear means having input means adapted to be driven by said rotary piston engine and output means adapted for driving wheel axles, said differential gear means being located beneath and secured to the oil pan means.

In a preferable aspect of the present invention, the rotary piston engine is located at a front portion of the vehicle and the differential gear means is adapted for driving front wheel axles. Power transmission means may be provided be driven by the rotary piston engine. The power transmission means may have an output member connected through transfer gear means and transfer shaft means to the input means of the differential gear means. Where the present invention is applied to a four-wheel-drive type vehicle, there may be provided center differential gear means which has input means adapted to be driven by said rotary piston engine, first output means connected with the first mentioned differential gear means and second output means for driving rear wheel axles. It is preferable that the rotary piston engine be arranged with the output shaft extending in a longitudinal direction of the vehicle.

The above and other objects and features of the present invention will become apparent from the following description of a preferred embodiment, taking reference to the accompanying drawings.

DESCRIPTION OF THE PREFERRED EMBODIMENT

Figure 1:
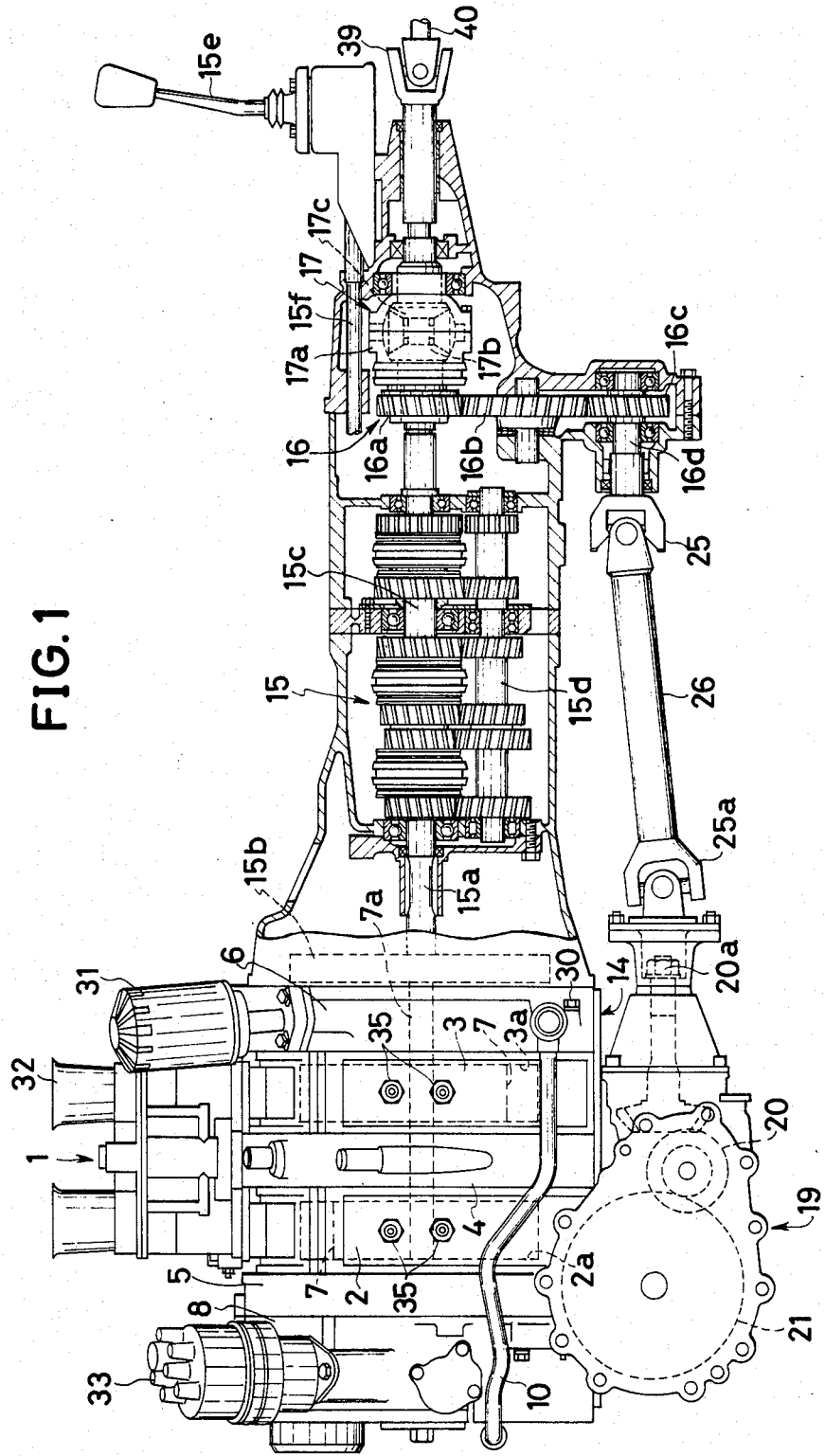
FIG. 1 is a side view of a power transfer mechanism in accordance with the present invention.

Referring to the drawings, there is shown a vehicle drive mechanism including a rotary piston engine 1 which may be of a type as shown in the U.S. Pat. No. 3,289,647, and which includes a casing comprising a pair of rotor housings 2 and 3, an intermediate housing 4 located between the rotor housings 2 and 3, a front side housing 5 at the front side of the rotor housing 2, and a rear side housing 6 at the rear side of the rotor housing 3. The housings 2 through 6 are secured together by means of a suitable number of tension bolts 30, which are inserted axially through the housings 2 through 6. In the rotor housings 2 and 3 there are respectively defined rotor cavities 2a and 3a in which rotors 7 of polygonal configuration are disposed and carried by an eccentric shaft 7a which constitutes an output shaft of the engine 1. On the casing, there are mounted an oil filter 31 and a carburetor 32. A front cover 8 is attached to the front side of the front side housing 5 and carries a distributor 33.

Referring to FIG. 1, it will be noted that a transmission unit 15 is provided rearward of the engine 1. The transmission unit 15 has an input shaft 15a connected through a power clutch 15b with the engine output shaft 7a. A main or output shaft 15c is provided coaxially with the input shaft 15a a counter shaft 15d is provided in parallel with the main shaft 15c. The main shaft 15c and the counter shaft 15d carry a plurality of sets of transmission gears, which are alternatively selected to provide a plurality of stages of gear ratios. In order to select a desired set of transmission gears, there is a shift lever 15e and a shift rod 15f, as is well known in the art.

Rearward of the transmission gear unit 15, there is a center differential gear unit 17 which has an input member 17a connected with the output shaft 15c of the transmission gear unit 15. The center differential gear unit 17 has a front output member 17b and a rear output member 17c. The rear output member 17c is connected through a universal joint 39 with a rear propeller shaft 40 which extends longitudinally rearward to drive, through a rear differential gear unit (not shown), rear wheel axles. Between the transmission gear unit 15 and the center differential gear unit 17, there is a transfer gear unit 16 which includes a drive gear 16a mounted on the front output member 17b of the center differential gear unit 17. The drive gear 16a is in meshing engagement with a counter gear 16b which is in turn meshed with a driven gear 16c formed on a shaft 16d. The gears 16a, 16b and 16c are arranged vertically in this order. The shaft 16d is connected through a universal joint 25 with one end of a transfer shaft 26. The other end of the transfer shaft 26 is connected through a second universal joint 25a with a front differential gear unit 19.

Figure 2:
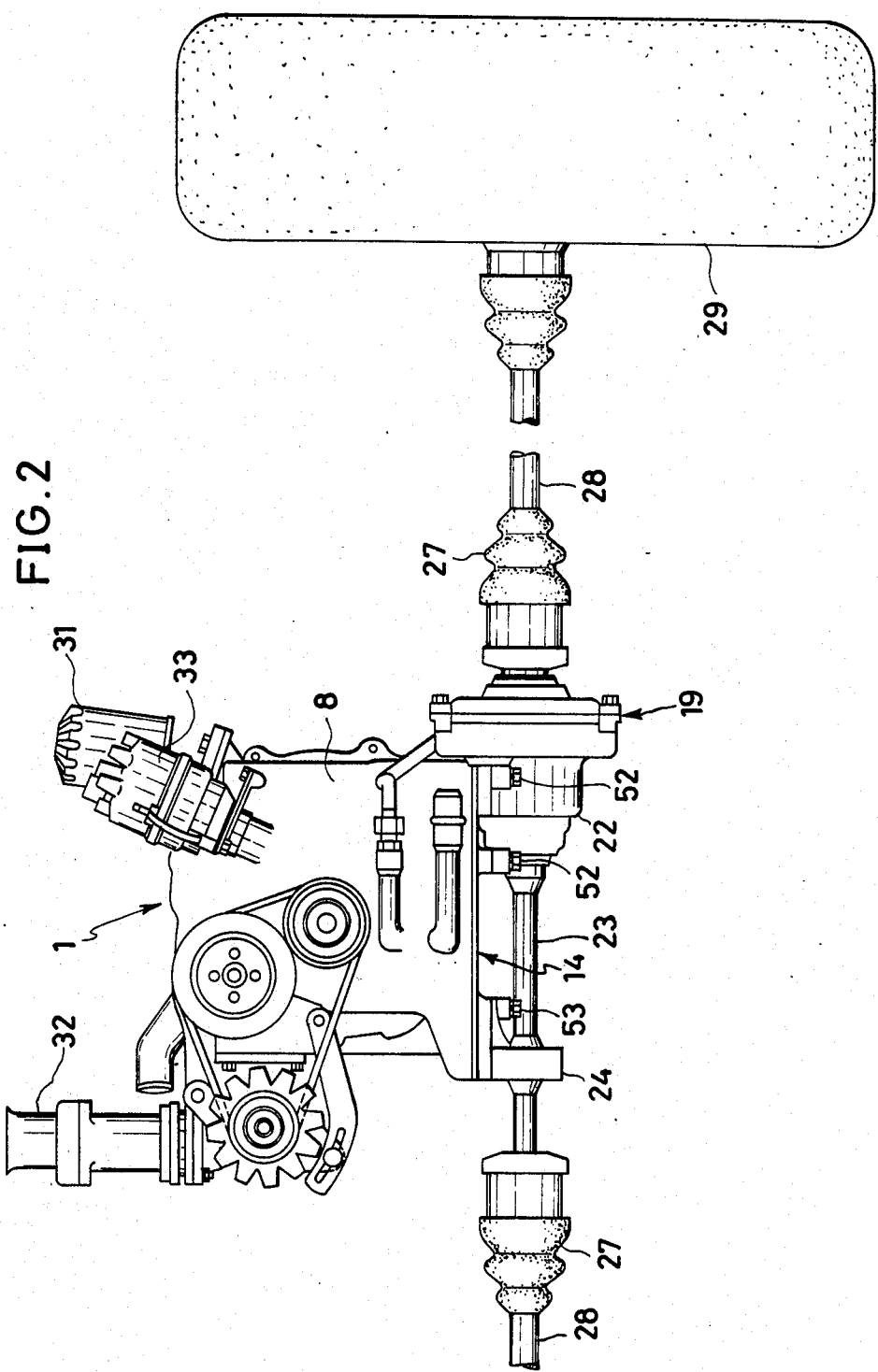
FIG. 2 is a front view of the mechanism shown in FIG. 1.
Figure 3:
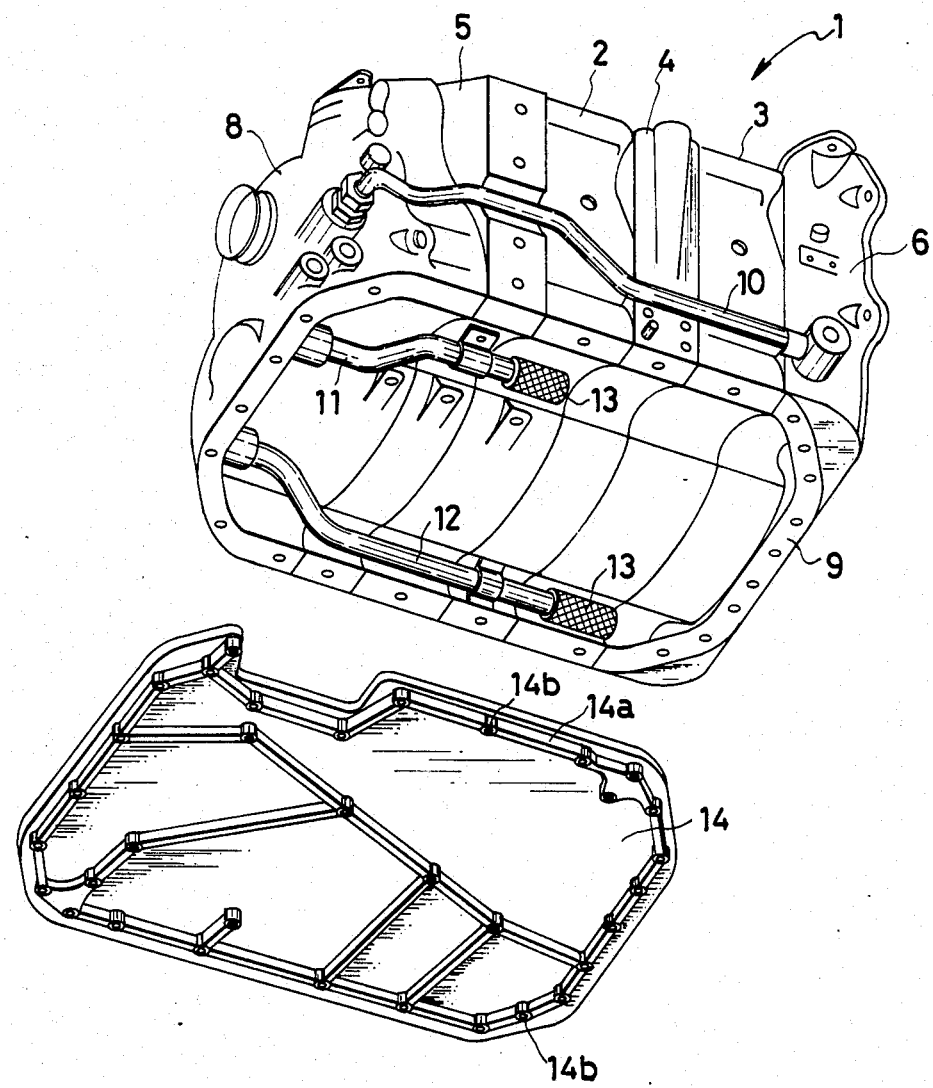
FIG. 3 is an exploded perspective view of the rotary piston engine and the oil pan.

Referring to FIGS. 1, 2 and 3, it will be noted that an oil pan 14 is attached to the lower part of the engine casing. As shown in FIG. 3, the engine casing comprising the housings 2 through 6 and the front cover 8 is formed at the lower end with a peripheral flange 9 and the oil pan 14 is attached at its peripheral edge portion to the peripheral flange 9 of the engine casing to define an oil reservoir chamber. Outside the engine casing, there is an oil pipe 10 and oil suction pipes 11 and 12 having oil strainers 13 are disposed in the oil reservoir chamber. The oil pan 14 is of a substantially flat configuration and formed at the peripheral portion of the lower surface thereof with a peripheral reinforcement rib 14a. A plurality of bolt holes 14b are formed along the reinforcement rib 14a so that attachment bolts can be inserted through the oil pan 14 into the peripheral flange 9 on the engine casing.

Figure 4:
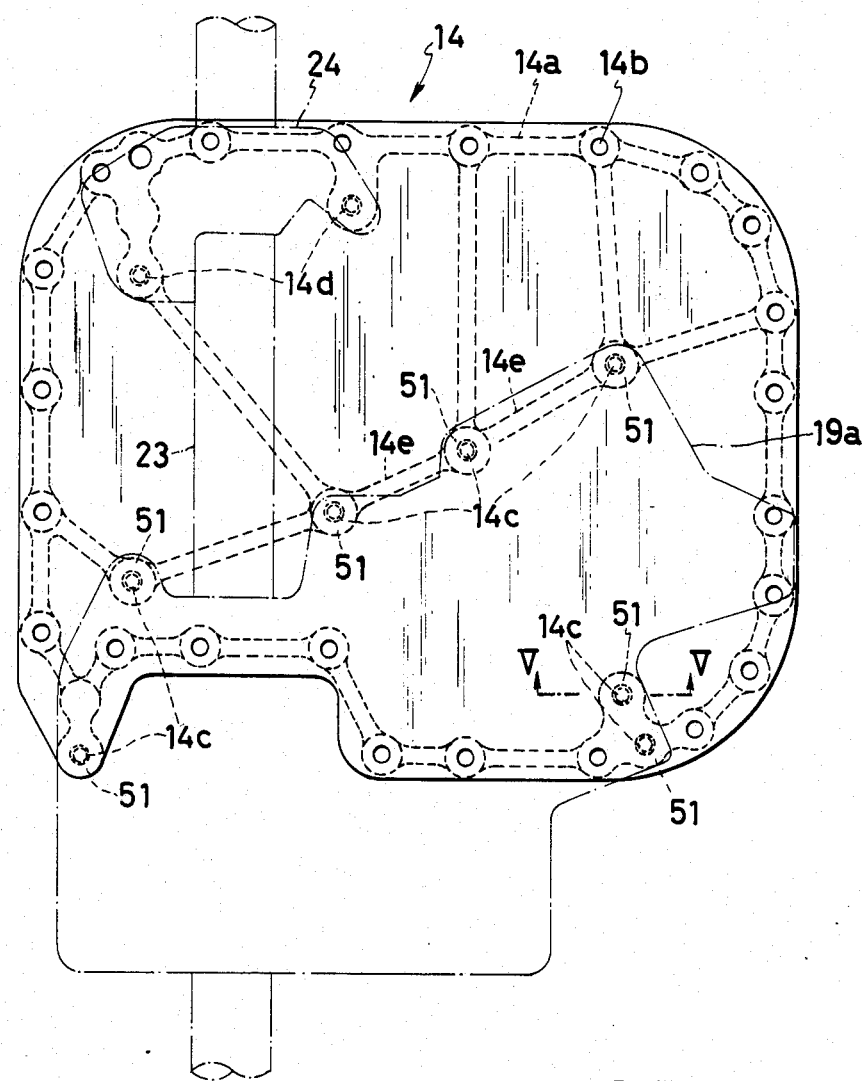
FIG. 4 is a plan view of the oil pan.
Figure 5:
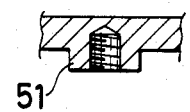
FIG. 5 is a sectional view taken along the line V—V in FIG. 4.

As shown in FIGS. 1 and 2, the front differential gear unit 19 is located beneath the engine 1 and attached to the oil pan 14. The front differential gear unit 19 includes a gear casing 19a which has attachment flanges 19b formed with bolt holes 19c, as shown by phantom lines in FIG. 6. As shown in FIGS. 4 and 5, the oil pan 14 is formed on the lower surface with a plurality of downwardly projecting protuberant portions 51 which are at locations corresponding to the bolt holes 19c on the attachment flanges 19b of the gear casing 19a. Each of protuberant portions 51 is formed with a threaded hole 14c. Thus, the gear casing 19a is attached to the lower surface of the oil pan 14 by means of bolts 52 at a position as shown by phantom lines in FIG. 4. Reinforcement ribs 14e may be formed as necessary between adjacent protuberant portions 51.

Figure 6:
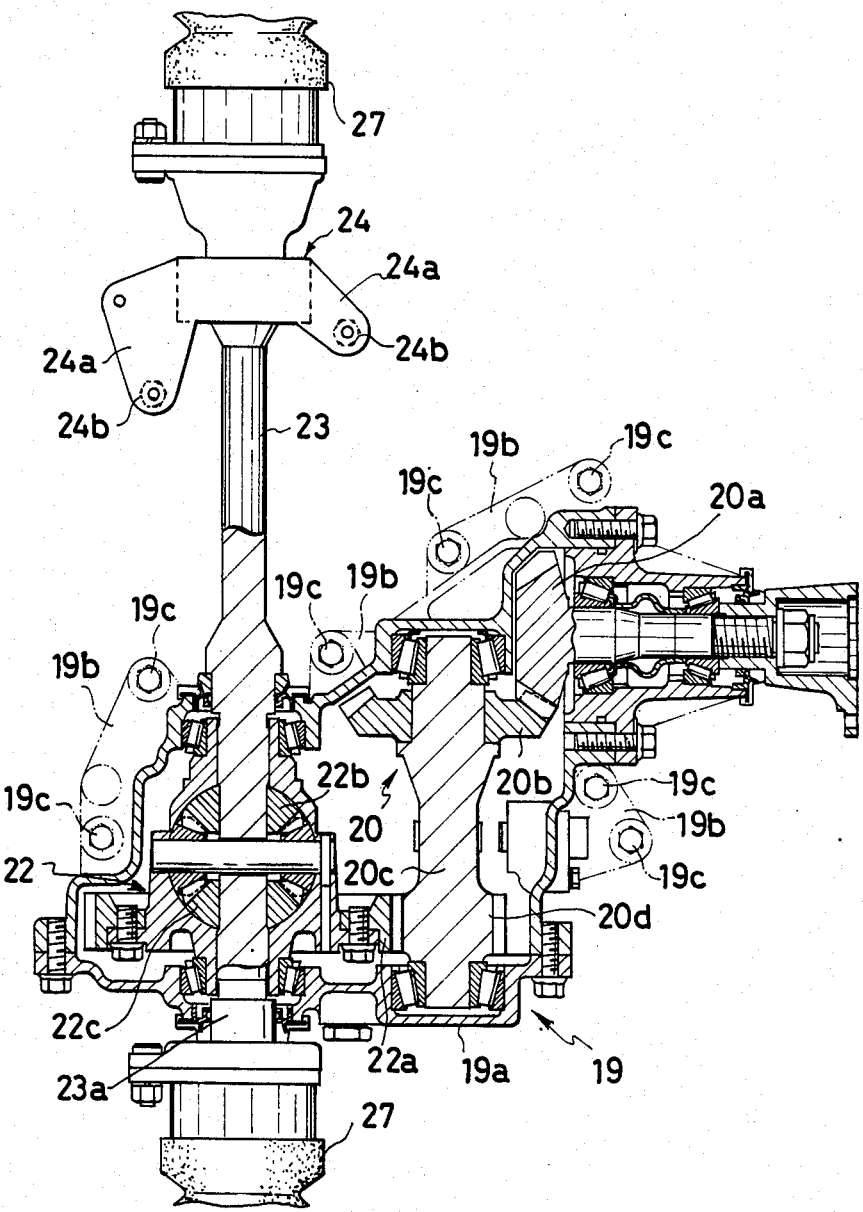
FIG. 6 is horizontal sectional view of the front axle drive mechanism with the front differential gear shown in section.

Referring to FIG. 6, it will be noted that the front differential gear unit 19 includes a final gear set 20 comprising an input level gear 20a and an intermediate bevel gear 20b which is in meshing engagement with the bevel gear 20a. The input bevel gear 20a is connected with the second universal joint 25a at the front end of the transfer shaft 26. The bevel gear 20b is mounted on a counter shaft 20c which is formed with a pinion 20d. The gear unit 29 further includes a differential gear assembly 22 comprising an input gear 22a and a pair of output gears 22b and 22c. The input gear 22a is engaged with the pinion 20d on the counter shaft 20c so as to be driven by the pinion 20d. The output gear 22b is connected with one end of a drive shaft 23 which is journalled by a bearing 24 on the oil pan 14. The other end of the drive shaft 23 is connected through a universal joint 27 with a right hand front axle 28. The output gear 22c is connected with a drive shaft 23a which is in turn connected through a universal joint 27 with a left hand front axle 28. The front axle 28 is connected with a steerable front wheel 29 in a manner well known in the art. As shown in FIG. 6, the bearing 24 has attachment flanges 24a formed with bolt holes 24b. The oil pan 14 is formed on the lower surface thereof with threaded holes 14d at locations corresponding to the bolt holes 24b in the bearing 24 so that the bearing 24 can be attached to the oil pan 14 by means of bolts 53 at a position as shown by a phantom line in FIG. 4.

In operation, the rotation of the engine output shaft 7a is transmitted through the power transmission mechanism 15 to the center differential gear unit 17. The engine power is then split into the rear propeller shaft 40 and the transfer gear unit 16. the rotation of the transfer gear unit 16 is transmitted through the transfer shaft 26 to the front differential gear unit 19 to drive the left and right front axles 28. A reaction force is transmitted through the gear casing 19a to the engine casing. However, since the gear casing 19a is attached to the oil pan 14, the reaction force is distributed among the housings 2 through 6 and the front cover 8. Therefore, it is possible to prevent the reaction force from acting in a manner to separate the housings 2 through 6 one from the other. It is therefore possible to maintain the sealing property of the engine casing.

The invention has thus been shown and described with reference to a specific embodiment. However, it should be noted that the invention is in no way limited to the details of the illustrated structures, but changes and modifications may be made without departing from the scope of the appended claims. For example, although the invention has been described with reference to a four-wheel drive vehicle, it can well be applied to a front-engine, front-drive vehicle or a rear-engine, rear-drive vehicle.

We claim:

1. A motor vehicle including a rotary piston engine located at a front part of the vehicle and having a casing comprised of a plurality of housings connected together, rotor means in said casing and rotatable about an axis of an output shaft of the engine, said output shaft extending in a longitudinal direction of the vehicle, speed changing transmission means located rearward of the engine and connected with the output shaft of the engine, center differential gear means having input means connected with said transmission means, first output means connected with a rear propeller shaft and second output means, oil pan means located beneath the rotary piston engine and having a peripheral portion secured to the casing of said rotary piston engine to define lubricant oil reservoir means, front differential gear means located beneath and secured to the oil pan means, said front differential gear means having input means adapted to be driven by said second output means of the center differential gear means and output means adapted for driving front wheel axles.

2. A motor vehicle in accordance with claim 1 which includes transfer means between said second output means of the center differential gear means and said front differential gear means.

3. A motor vehicle in accordance with claim 1 which includes a transfer shaft extending between said transfer means and said front differential gear means for transmitting power therebetween.

4. A motor vehicle in accordance with claim 3 in which said transfer shaft is located beneath the transmission means and extends in a longitudinal direction of the vehicle.

5. A motor vehicle in accordance with claim 1 in which said oil pan means is of a substantially flat configuration.

6. A motor vehicle in accordance with claim 5 in which said oil pan means is formed at a lower surface with a plurality of protuberant portions which are formed with downwardly opening threaded bolt holes adapted for receiving attachment bolts for attaching the differential gear means to the oil pan means.

7. A motor vehicle in accordance with claim 6 in which said oil pan means is formed with reinforcement rib means extending between the protuberant portions.

8. A motor vehicle in accordance with claim 6 which includes bearing means for supporting a drive shaft extending between the differential gear means and the wheel axle.

9. A motor vehicle comprising a rotary piston engine including a casing comprised of a rotor housing having an inner wall of trochoidal configuration and a pair of side housings attached to the opposite sides of said rotor housing to define a rotor cavity in the casing, a rotor disposed in said rotor cavity for rotation and supported by an output shaft, said output shaft extending in a longitudinal direction of the vehicle, speed changing transmission means located rearward of the engine and connected with the output shaft of the engine, a rear propeller shaft connected with the speed changing transmission means, transfer means having input means connected with said speed changing transmission means and output means, oil pan means located beneath the rotary piston engine and having a peripheral portion secured to the casing of said rotary piston engine to define lubricant oil reservoir means, front differential gear means having input means adapted to be driven by said output means of the transfer means and having output means adapted for driving wheel axles, said front differential gear means being located beneath and secured to the oil pan means.

* * * * *